Jan. 13, 1959  D. ARRAS  2,868,564
HOSE CONNECTOR WITH AXIALLY SLIDING LOCKING SLEEVE
Filed Nov. 13, 1957
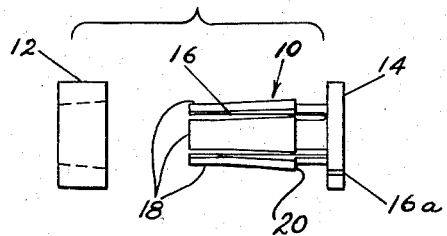
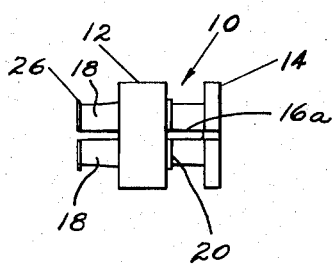
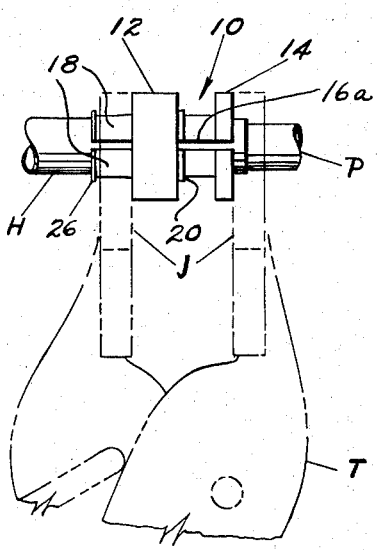
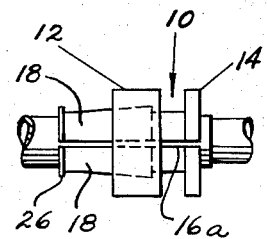
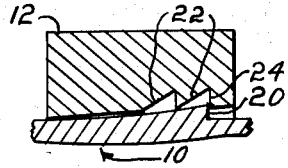
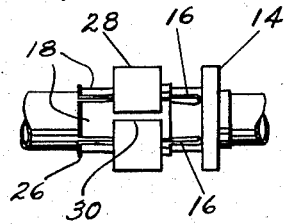
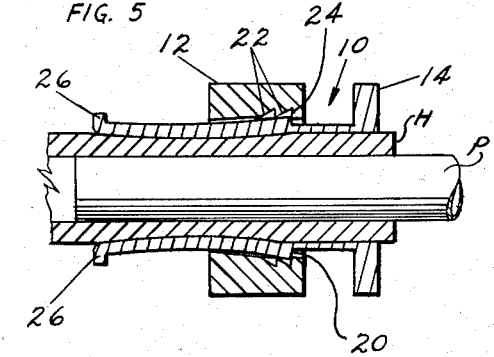
INVENTOR.
DAMIANO ARRAS
BY
Teller & McCormick
ATTORNEYS

United States Patent Office 2,868,564
Patented Jan. 13, 1959

2,868,564

HOSE CONNECTOR WITH AXIALLY SLIDING LOCKING SLEEVE

Damiano Arras, New Britain, Conn.

Application November 13, 1957, Serial No. 696,169

3 Claims. (Cl. 285—243)

This invention relates to an improved connector or coupling for attaching a hose to a pipe or fitting or the like in a leak-proof manner.

It is the general object of the invention to provide a hose connector or coupling of the aforementioned general type which is capable of application where the pressures to be encountered are extraordinarily high, which is adapted to be connected and disconnected as often as may be necessary without material damage to the hose and without loss to the connector of its ability to withstand pressure or of its power of retention, which is adapted for use on hose not easily compressed, and which is characterized by its simplicity from the standpoint of manufacture and from the standpoint of application and use.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

Fig. 1 is a plan view of the two elements of the connector and which comprise a clamping sleeve and a ring, the elements being shown separated before assembly;

Fig. 2 is a plan view of the connector showing the clamping sleeve and ring in assembled relationship but before the application of clamping force;

Fig. 3 is a view similar to Fig. 2 but showing the connector unit as applied to a hose;

Fig. 4 is a view similar to Fig. 3 but showing the ring drawn up on the sleeve to apply the clamping force;

Fig. 5 is an enlarged cross-sectional view through the coupling showing it engaged in clamping relationship on the hose;

Fig. 6 is an enlargement of a portion of Fig. 5 to show the locking engagement of the ring on the sleeve; and Fig. 7 is a view similar to Fig. 3 but showing a modified or alternative construction.

As best shown in Fig. 1, the hose connector provided in accordance with the present invention includes two elements, namely, a clamping sleeve 10 and a ring 12 which is adapted to embrace the clamping sleeve and to be moved longitudinally thereof to apply the required clamping force. The connector is to be used for attaching a hose or the like to a pipe or to another object such as a grease fitting which can be received within one end portion of the hose. That is, the clamping sleeve 10 and the surrounding ring 12 are placed over the said one end portion of the hose and forces are applied by the ring through the sleeve to compress or clamp the hose on the pipe or other object.

The sleeve per se is fabricated from metal, preferably a metal known for its resilient properties or which can be spring tempered, and the sleeve is formed with a substantially cylindrical longitudinal bore which receives the said one end portion of the hose. A radially outwardly projecting flange 14 is formed on one end of the sleeve, and it is this end of the sleeve which is to be disposed adjacent the end of the hose when the end portion thereof is received within the sleeve. The body of the sleeve comprising that portion thereof extending from the other end to the flange 14 is provided with a plurality of circumaxially spaced generally longitudinal slots 16, 16 which extend from said other end substantially to the flange 14. The said slots are preferably equally circumaxially spaced and one of the slots, the slot 16a, extends through the flange 14 to permit contraction thereof like a split ring. The slots 16, 16 and the slot 16a divide the body portion of the sleeve 10 into a plurality of segments 18, 18.

Each sleeve body or wall segment 18 is relatively thin adjacent said other end of the sleeve, the end which does not have the flange, but an external taper is provided on each segment so that the thickness thereof increases in the direction from said other end toward the end having the flange. However, the taper does not extend all of the way to the flange, the thickest portion of each segment being spaced a substantial distance from the flange 14 to define a shoulder 20 which is spaced from and faces toward the flange. That portion of each segment between the shoulder and the flange 14 is of reduced thickness to provide for flexibility of the segment. That is, by providing the taper on each segment and the section of reduced thickness between the taper and the flange, all of the segments can be flexed radially inwardly when embracing means are moved along the taper toward the flange.

The ring 12 constitutes the means for flexing the sleeve segments inwardly to compress or clamp the hose on a pipe or the like and to contract the sleeve including the flange upon the hose. That is, the ring 12 is provided with a tapered internal bore complementary to the external taper on the sleeve 10 whereby the ring can be advanced along the smooth external tapered surface of the sleeve toward the flange to cause the aforesaid contraction of the sleeve and the inwardly flexing movement of the segments thereof by a wedging or camming action. It is a feature of construction of the ring 12 that at least one and preferably a plurality of annular grooves 22, 22 are provided in the ring bore adjacent to but nonetheless spaced from the larger end thereof. As best shown in Fig. 5, each groove 22 is of saw-tooth shape in cross section so as to define a shoulder 24 which will face toward and be opposed by the shoulder 20 on each sleeve segment. When the ring 12 is "drawn up" on the sleeve 10 to contract the same and to flex the segments thereof, there will be a slight overlapping of a groove shoulder 24 with respect to the sleeve shoulders 20, 20 on the segments. This slight overlapping engaged relationship of the said shoulders prevents inadvertent and undesirable slipping of the ring on the sleeve, that is, the overlapped shoulders prevent the ring from moving away from the sleeve flange toward the other end of the sleeve. However, the shoulders 20 and 24 are not overlapped to an extent which prevents disengagement thereof by the application of a relatively slight force at a desired time.

Preferably, the sleeve and ring are loosely assembled as shown in Fig. 2 before the connector unit is applied to a hose. It is also preferred that the said other end or free end of each sleeve segment 18 be swaged or otherwise turned outwardly as indicated at 26 to prevent withdrawal of the ring 12 from the sleeve 10 after they have been loosely connected. That is, the ends of the segments are turned outwardly as indicated at 26 so that the said outturned ends are of greater diameter than the smaller end of the ring bore. This provides ease in packaging and handling the elements of the connector.

With the ring and sleeve loosely connected as shown in Fig. 2, the connector unit can easily be placed over the end portion of a hose H which receives within its bore a pipe P or a similar rigid object such as a grease fitting or a plug. After the connector unit has been placed over the said end portion of the hose, the ring 12 can conveniently be drawn up on the sleeve or moved toward the sleeve flange 14 by means of a tool T such as a toggle pliers. The pliers has bifurcated jaws J, J which will embrace the sleeve 10 and projecting end of the hose H and engage against the ring 12 and the sleeve flange 14, respectively, for the application of force thereto to advance the ring toward the flange. After the application of force by the tool 10, the sleeve and ring will assume the position shown in Figs. 4 and 5 and it should be noted particularly with reference to Fig. 4 that the slot 16a which splits the sleeve has been relatively closed with contraction of the sleeve.

It will be obvious that in addition to contracting the sleeve on the hose, movement of the ring 12 along the sleeve 10 causes the segments 18, 18 thereof to be flexed radially inwardly against the hose, such flexing movement being permitted by provision of the slots 16, 16 and by providing the reduced thickness wall sections between the segment or sleeve shoulders 20, 20 and the flange 14. Thus, the clamping force applied to the hose is not localized but is distributed over the length of the sleeve. It has been found that the clamping force applied by the aforedescribed connector is sufficient to provide a sealed connection capable of withstanding extraordinarily high pressure. Despite the high force grip provided by the connector it can easily be disengaged. That is, if force is applied between the ring and the flange and against such members the overlapped sleeve and ring shoulders 20 and 24 can easily be disengaged and the ring moved toward the small diameter end of the sleeve whereby the sleeve can be removed from the hose. A screw driver can conveniently be used for the purpose of effecting the disengagement. That is, the blade of the screw driver can be inserted between the ring 12 and the flange 14 and then twisted to separate them and to effect disengagement of the shoulders.

It should also be obvious that the hose connector is inherently adapted for application on hose of varying diameters. That is, the tapered surfaces of the sleeve and ring permit closing the sleeve on different hose varying in size. If a hose of less diameter than that shown in the drawing is inserted within the sleeve which is shown, the said hose can still be clamped by moving the ring 12 closer to the flange 14 whereby to cause engagement between another groove shoulder 24 and the sleeve shoulder or shoulders 20.

The modified or alternative form of construction shown in Fig. 6 incorporates the features of the first described embodiment, but in addition thereto, the alternative construction is adapted particularly for application where major temperature changes may be anticipated which would cause a material variation in the diameter of the hose and/or pipe to which the connector is applied. In the modified form, the same sleeve element 10 is employed as in the first described embodiment, but a modified ring 28 is used. The ring 28 is the same as the first described ring 12 except that it is split by providing a slot 30 in its wall extending generally longitudinally therethrough. This permits expansion of the connected hose when subjected to extremely high temperature without increasing the binding force of the connector to a point where damage might occur to the hose or to the connector. In the alternative form the ring 28 is preferably formed of spring tempered metal and is more thick and heavy than the first described embodiment. The spring tempered, split ring will expand with an increase in temperature, but will contract or close with a decrease in temperature.

The invention claimed is:

1. A hose connector comprising a clamping sleeve having a normally cylindrical longitudinal bore for closely receiving the external surface of an end portion of a hose and also having a plurality of circumaxially spaced slots each extending from a point adjacent to but nonetheless spaced from one end of the sleeve and extending through the other end of the sleeve to divide the body thereof into a plurality of generally longitudinal segments, each segment of the sleeve body having a smooth external surface which is tapered to provide for increasing body thickness from said other end and to define a shoulder spaced from and facing toward the said one end, a portion of each body segment between the shoulder and the said one end being of reduced thickness, and a ring embracing the body segments and having a substantially complementary tapered closely fitting bore for sliding movement along the tapered external surfaces thereof from said other end toward said one end whereby to flex the body segments radially inwardly to clamp a hose received in the bore of the sleeve, said ring being of substantially less axial extent than said body and having an internal annular groove defining a shoulder confronting the shoulder of said body segments, said groove having sufficient axial length to receive a portion of each body segment including the body shoulder whereby the body shoulder may radially expand into the groove in the ring and engage the said confronting shoulder thereon when the segments are flexed inwardly, thereby to prevent the ring from slipping on the sleeve toward said other end thereof until said shoulders have been disengaged.

2. A hose connector as defined in claim 1 and wherein a radially extending flange is provided on said one end of the sleeve and the slots extend from adjacent said flange through the said other end of the sleeve, and wherein the said ring has a plurality of the said internal annular grooves which are longitudinally spaced apart in the ring.

3. A hose connector as defined in claim 1 and wherein a radially extending flange is provided on said one end of the sleeve and the slots extend from adjacent said flange through said other end of the sleeve, and wherein the ends of the segments at said other end of the sleeve are turned radially outwardly to prevent inadvertent removal of the ring from the sleeve.

References Cited in the file of this patent

UNITED STATES PATENTS

| 1,113,080 | Wilson | Oct. 6, 1914 |
| 1,284,163 | Walker | Nov. 5, 1918 |
| 1,981,243 | Newmark | Nov. 20, 1934 |
| 2,328,013 | Hattan | Aug. 31, 1943 |
| 2,420,617 | Paquin | May 13, 1947 |

FOREIGN PATENTS

| 19,231 | Great Britain | Aug. 29, 1914 |
| 8,458 | Great Britain | June 7, 1915 |
| 328,787 | Great Britain | May 8, 1930 |
| 768,968 | France | May 28, 1934 |